W. P. SOWERS.
GATE.
APPLICATION FILED JUNE 19, 1908.

913,574.

Patented Feb. 23, 1909.
2 SHEETS—SHEET 1.

Witnesses
Frank B. Hoffman
E. P. Bunyea

Inventor
William P. Sowers
By Victor J. Evans
Attorney

W. P. SOWERS.
GATE.
APPLICATION FILED JUNE 19, 1908.

913,574.

Patented Feb. 23, 1909.
2 SHEETS—SHEET 2.

Witnesses
Frank B. Hoffman

Inventor
William P. Sowers
By Victor J. Evans
Attorney

THE NORRIS PETERS CO., WASHINGTON, D. C.

UNITED STATES PATENT OFFICE.

WILLIAM P. SOWERS, OF VALLEY VIEW, KENTUCKY, ASSIGNOR OF ONE-HALF TO HENRY C. HOWE, OF VALLEY VIEW, KENTUCKY.

GATE.

No. 913,574.    Specification of Letters Patent.    Patented Feb. 23, 1909.

Application filed June 19, 1908. Serial No. 439,391.

*To all whom it may concern:*

Be it known that I, WILLIAM P. SOWERS, a citizen of the United States of America, residing at Valley View, in the county of Madison and State of Kentucky, have invented new and useful Improvements in Gates, of which the following is a specification.

This invention relates to gates, and one of the principal objects of the same is to provide a gate with improved means for opening and closing the same.

Another object of the invention is to provide a gate with an opening and closing device which will not stop upon a dead center in the act of opening or closing the gate.

These and other objects may be attained by means of the construction illustrated in the accompanying drawings, in which,—

Figure 1:
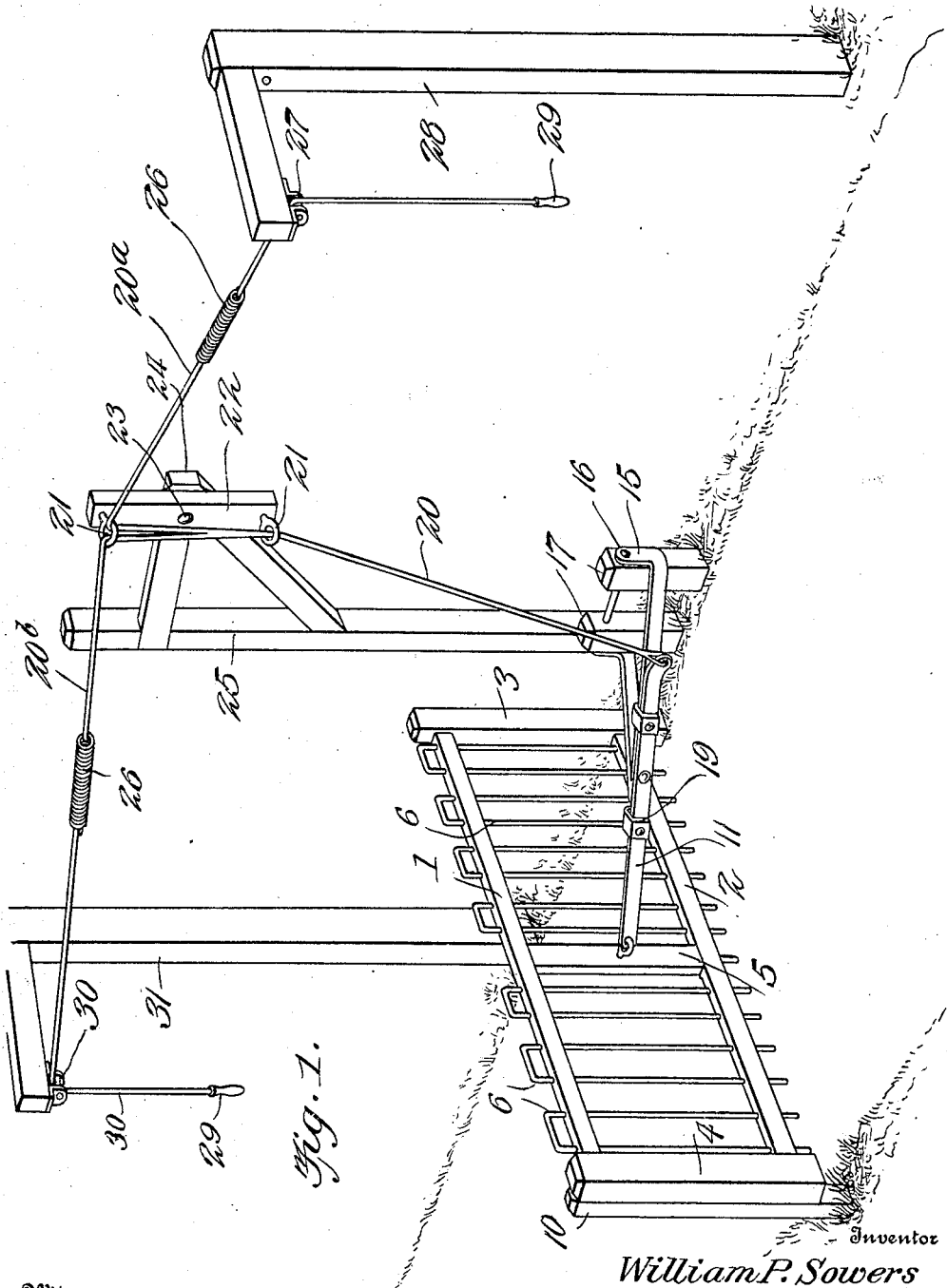
Figure 2:
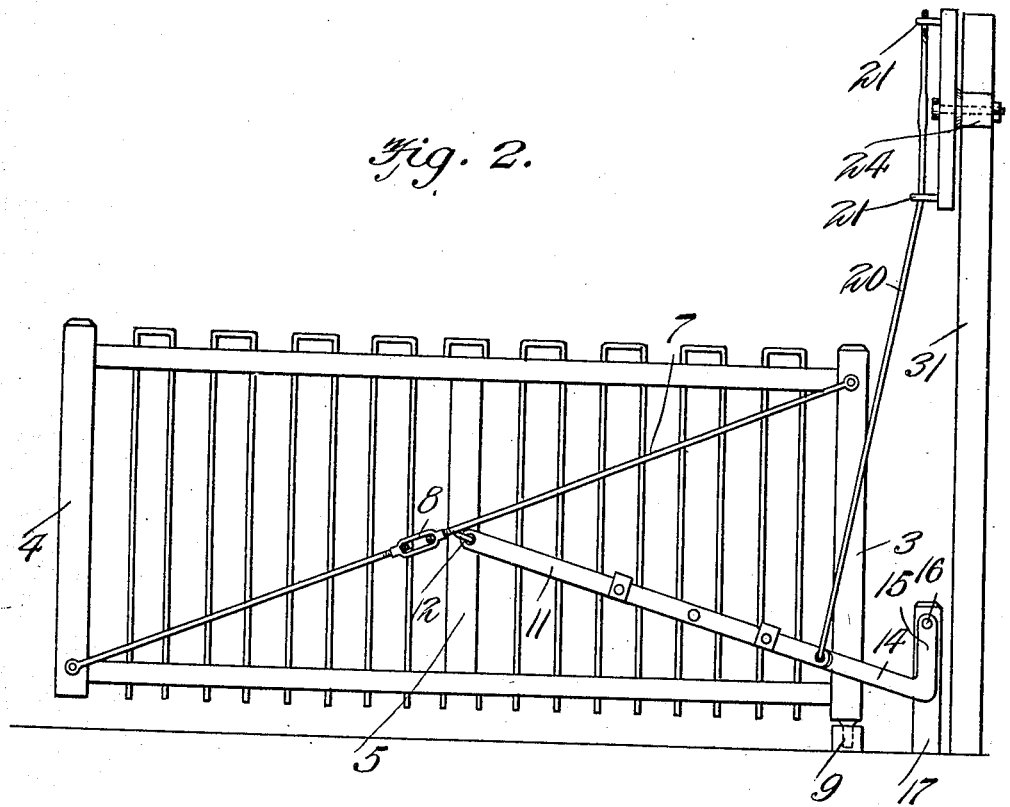
Figure 3:
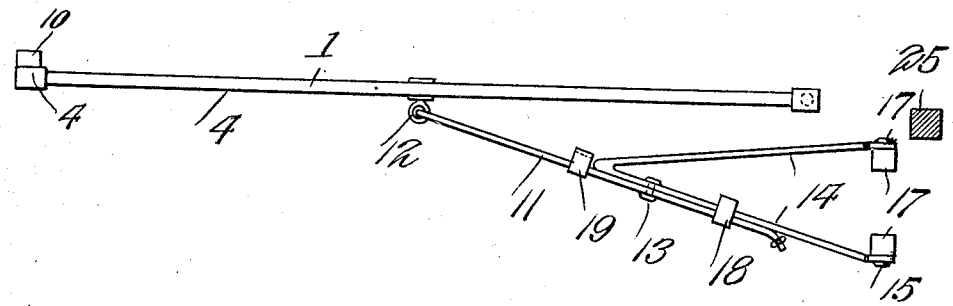

Figure 1 is a perspective view of a gate made in accordance with my invention. Fig. 2 is a front elevation of a gate made in accordance with my invention, said gate being provided with an adjustable diagonal brace to prevent the gate from sagging at the free end. Fig. 3 is a plan view of the same.

Referring to the accompanying drawing, the gate which may be of any suitable construction is shown as comprising a top rail 1, a bottom rail 2, a pivot post 3, an end upright 4 and a central vertical brace 5. The pickets are shown as being composed of wire members 6.

As shown in Fig. 2, a diagonal brace 7 extends from the upper end of the post 3 to the lower end of the upright 4, and a turn buckle 8 connects the two threaded ends of the brace 7 to adjust the gate and to prevent sagging at the outer end.

The post 3 is pivoted in a suitable block 9. A stop post 10 is driven into the ground in line with the upright 4 of the gate.

The gate-operating mechanism comprises a compound lever consisting of the straight member 11 connected to the vertical bar 5 by means of a ring or screw-eye 12 which engages the hole in one end of said lever and thus permits the free movement with relation to the gate. Pivoted at 13 to the member 11 is a V-shaped member comprising the divergent arms 14, each of which is provided with a vertical branch 15, and said branches are pivoted at their upper ends at 16 to posts 17. The member 11 has riveted to it a pair of stops 18 and 19, the stop 18 being adapted to engage the member 14 when the gate is closed and to hold the gate against swinging too far, while the stop 19 engages the underside of the same member 14 when the gate is opened to its fullest extent. Connected to the outer end of the member 11 is a rope, or similar flexible connection, 20 which extends upwardly and passes through a pair of rings 21 carried by a lever 22 which is pivoted at 23 to a bracket 24 extending to one side of a post 25. The rope or flexible connection 20 is divided or branched, and one of the branches 20ᵃ is provided with a spring 26 and is led from thence over a pulley 27 mounted in a post 28, the end of said rope or flexible connection having a weighted handle 29 thereon. The branch 20ᵇ of the rope or flexible connection is also provided with a spring 26, and the flexible connection is led from the spring over a pulley 30 mounted in a post 31, and said rope is also provided with a handle similar to the one already described.

The operation of my gate may be briefly described as follows: By grasping either one of the handles 29 of the flexible connection 20 and pulling downward upon the same, the lever member 11 is raised, thus swinging the gate upon its pivot until the stop 19 comes in contact with the lower edge of the member 14 to stop the gate from further movement. When there is a pull on one end or the other of the rope the lever 22 is rocked upon one side or the other of its pivotal point 23 and immediately returns to its original position upon release of the handle. The springs 26 serve to prevent the gate from stopping upon a dead center.

My gate is of simple construction, can be manufactured at slight cost, cannot readily get out of order, is quick in operation and works smoothly wherever used.

Having thus described the invention, what is claimed as new, is:—

1. A gate provided with an operating lever comprising a straight member, a V-shaped member pivoted thereto, said V-shaped member having angular branches pivoted to posts driven into the ground, stops on the straight member of the lever to engage one of the bars of the V-shaped member, and a flexible connection extending from the straight member of the lever through rings mounted upon a pivoted lever, said flexible connection extending outward and through separate posts at some distance from the gate.

2. A gate having operative mechanism consisting of a straight member pivoted to the gate at one end and provided with stops at opposite sides of its pivotal point, a V-shaped lever to which said straight member is pivoted, means for operating said straight member for opening the gate, a flexible connection having springs therein, and a weighted handle upon the opposite ends of said flexible connection.

3. In a gate, a compound lever consisting of a straight bar and a V-shaped bar pivoted together, stops on the straight bar to engage the V-shaped bar, and a flexible connection for operating said lever, said flexible connection being branched and provided with springs.

In testimony whereof I affix my signature in presence of two witnesses.

WILLIAM P. SOWERS.

Witnesses:
J. S. Sowers,
Isaac Loffey.